(12) United States Patent
Robbins, III

(10) Patent No.: US 7,562,864 B2
(45) Date of Patent: Jul. 21, 2009

(54) FENCE SPLICE COVER ASSEMBLY

(76) Inventor: Edward S. Robbins, III, 2808 Avalon Ave., Muscle Shoals, AL (US) 35630

( * ) Notice: Subject to any disclaimer, the term of this patent is extended or adjusted under 35 U.S.C. 154(b) by 0 days.

(21) Appl. No.: 12/200,079

(22) Filed: Aug. 28, 2008

(65) Prior Publication Data

US 2009/0090897 A1    Apr. 9, 2009

Related U.S. Application Data

(60) Provisional application No. 60/978,457, filed on Oct. 9, 2007.

(51) Int. Cl.
E04H 17/02 (2006.01)
(52) U.S. Cl. .......................... 256/52; 256/54
(58) Field of Classification Search .................. 256/41, 256/47–58; 403/204, 286, 293
See application file for complete search history.

(56) References Cited

U.S. PATENT DOCUMENTS

| | | | |
|---|---|---|---|
| 2,887,333 A * | 5/1959 | Shield | 256/54 |
| 4,465,263 A | 8/1984 | Robbins, Jr. | 256/52 |
| 4,706,942 A | 11/1987 | Robbins, Jr. | 256/35 |
| 4,860,996 A | 8/1989 | Robbins, III | 256/10 |
| 5,828,005 A * | 10/1998 | Huynh-Ba et al. | 174/92 |
| 5,962,811 A | 10/1999 | Rodrigues et al. | 174/76 |
| 6,152,429 A | 11/2000 | Pettigrew | 256/42 |
| 6,834,846 B2 | 12/2004 | Robbins, III | 256/10 |
| 7,141,738 B2 | 11/2006 | Marsac et al. | 174/92 |
| 7,333,709 B2 | 2/2008 | Carpenter et al. | 385/136 |
| 2008/0179580 A1 * | 7/2008 | McGinness et al. | 256/64 |

* cited by examiner

Primary Examiner—Victor MacArthur
(74) Attorney, Agent, or Firm—Brinks Hofer Gilson & Lione

(57) ABSTRACT

A fence splice cover assembly includes a first cover portion and a second cover portion that, when assembled, enclose a portion of fence that has been joined by a plurality of splices. A fastener is used to connect the first cover portion to the second cover portion. The first and/or second cover portions can include channels configured to receive the fence portion joined by the plurality of splices. The first and second cover portions can be identical and situated in a mirror image location when assembled.

1 Claim, 2 Drawing Sheets

FENCE SPLICE COVER ASSEMBLY

CROSS-REFERENCE TO RELATED APPLICATIONS

This application is related to and claims all available benefits from provisional application Ser. No. 60/978,457 filed Oct. 9, 2007.

BACKGROUND

Fences are commonly used to confine livestock, such as farm animals, steers, and thoroughbred race horses. Fences may vary greatly in both structure and materials used in their construction. Fence structures which are commonly available include those made of wire, (barbed wire, chain link, etc.), and wood (picket, split rail, etc.).

The materials used to construct a particular fence are often selected on the basis of initial costs, upkeep cost, durability, strength, aesthetic characteristics and animal safety requirements. The most commonly used materials include metal and/or wood. While concrete and stone are readily available, the cost is often prohibitive.

The most commonly used fencing material for livestock has been barbed wire. This is due to the low cost of installation and maintenance that such material presents. However, barbed wire can cause painful and unsightly injury to valuable livestock. Also, such material is difficult for the animal to detect and, all too often, the animal is injured during contact with this unseen barrier. Other materials, such as web wire fencing and cyclone wire fencing suffer from similar limitations. In addition, they tend to be expensive to install and maintain and, over time, can also operate to injure livestock.

Wood fences, on the other hand, while expensive to install and maintain, generally do not operate to injure livestock. Wood fences also offer a pleasing and aesthetic appearance.

In order to solve the difficulties presented by commonly available wire and wood fences, a fencing system using high tensile wire jacketed by polymer or vinyl coating has been developed. This type of fencing is typified by that illustrated in FIG. 8 of U.S. Pat. No. 4,706,942, as well as in U.S. Pat. Nos. 4,465,263; 4,860,996 and 6,834,846.

Another method and apparatus for forming a fence line system comprised of a plurality of fence post members that are disposed in an array so as to enclose or divide a given area of land is typified by that illustrated and described in U.S. Pat. No. 6,152,429.

While the system of jacketed high tensile wire presents a satisfactory solution to the above-mentioned problems, there is a need for an improved splice system which is relatively inexpensive, durable, strong, safe for physical contact with livestock, and ultimately easy to install.

SUMMARY OF THE INVENTION

In one embodiment, the fence splice cover assembly includes a first cover portion and a second cover portion that, when assembled, enclose a portion of fence that has been joined by a plurality of splices. A fastener is used to connect the first cover portion to the second cover portion. In some embodiments, the first cover portion can include channels configured to receive the fence portion joined by a plurality of splices. In other embodiments, both the first and second cover portions can include channel to receive the fence portion.

In order to ease installation, some embodiments of the fence splice cover assembly can include a hinge that couples the first and second cover portion. Still, in other embodiments, the first and second cover portions can be interchangeable such that only one part need be manufactured. While various materials can be used to form the splice cover assembly, at least one embodiment is formed from extruded vinyl.

In an alternative embodiment, the fence splice cover assembly can include a first cover portion having a plurality of channels. Each respective channel can include a cavity to receive a coupling mechanism operably coupling a first tensioning member and a second tensioning member of a fence that is coupled by a metal splice. In addition, the fence splice cover assembly can further include a second cover portion including a plurality of channels, each channel also including a cavity to receive the coupling mechanism operably coupling the first tensioning member and the second tensioning member and constructed to receive a portion of the first tensioning member and the second tensioning member. Moreover, the respective cavity of the first cover portion and the respective cavity of the second cover portion can be configured to engage the respective coupling mechanism so as to lock the fence splice cover in place relative to the splice position in the fence.

In yet another embodiment, the respective cover portions can further include a fastener mechanism to fasten the respective covers together. In still another embodiment, the first cover can further include a connection hole configured to receive an engaging protrusion and the second cover has an engaging protrusion configured to lock the engaging protrusion into the connection hole.

BRIEF DESCRIPTION OF THE DRAWINGS

These and other features and advantages of the invention will become more readily apparent from the following detailed description of the presently described embodiments while taken together with the accompanying drawings, of which.

DESCRIPTION OF PREFERRED EMBODIMENTS

Figure 1:
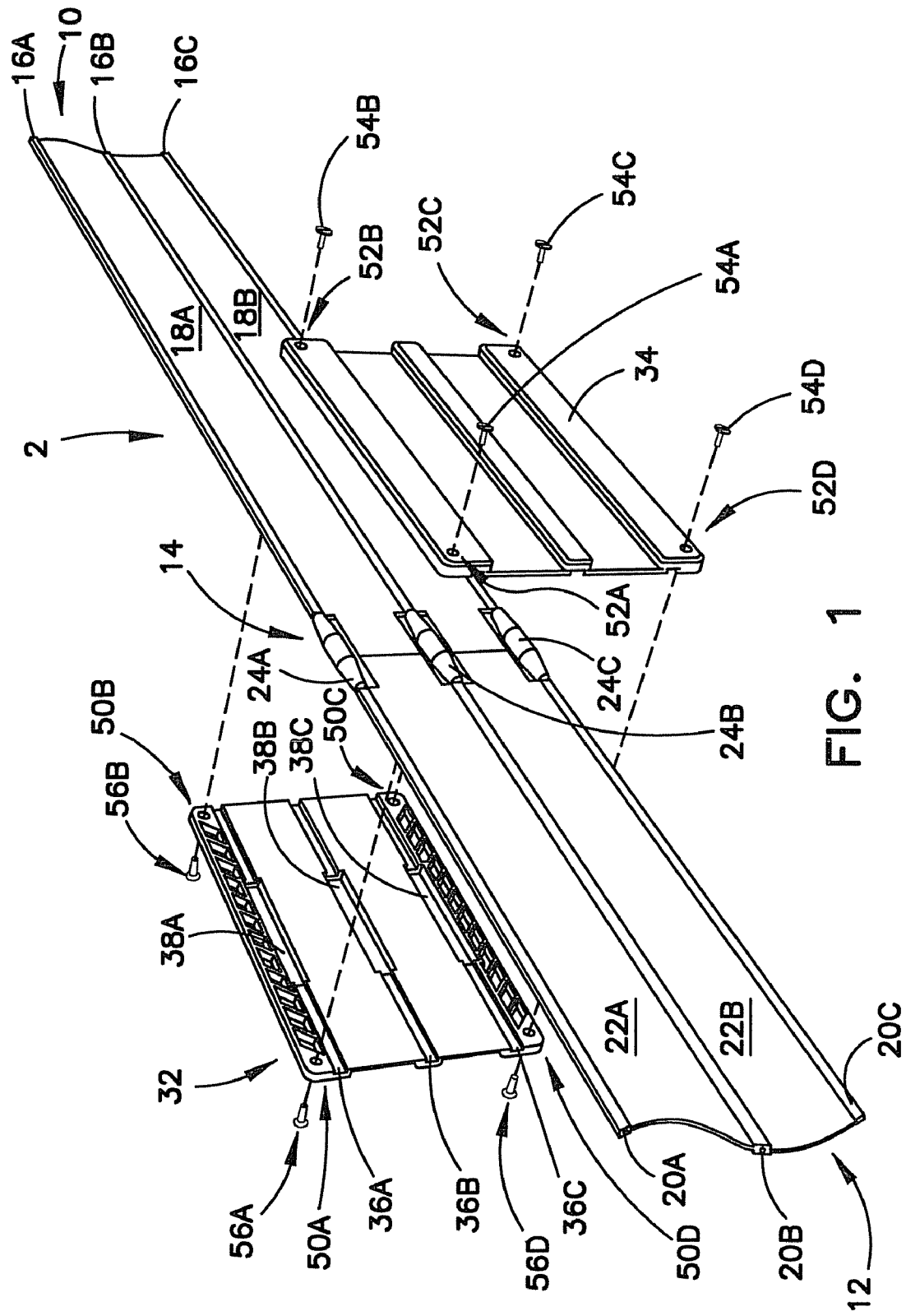
FIG. 1 is a perspective view of the improved splice cover assembly in relation to a polymer coated fence that is spliced together.

FIG. 1 shows a fence portion 2 comprising a first fence section 10 and second fence section 12 that is joined by connection 14. In a first embodiment, the first and second fence sections 10,12, are polymer-coated fence. The first fence section 10 includes a plurality of tensioning members 16A, 16B, and 16C that are positioned approximately parallel to each other and covered in a polymer-coated material to provide protection to the respective tension members. Tensioning member 16A is coupled to tensioning member 16B by polymer sheet 18A. Tensioning member 16B is coupled to tensioning member 16C by polymer sheet 18B. Similarly, second fence section 12 includes a plurality of tensioning members 20A, 20B, and 20C that are also positioned approximately parallel relative to each other and covered in a polymer-coated material. Tensioning member 20A is coupled to tensioning member 20B by polymer sheet 22A. Tensioning member 20B is coupled to tensioning member 20C by polymer sheet 22B.

Connection 14 is formed by coupling the respective tensioning member 16A, 16B, and 16C of first fence section 10 to respective tensioning member 20A, 20B, and 20C of second fence section 12 using respective coupling mechanisms 24A, 24B, and 24C. By way of a non-limiting example illustration, coupling mechanisms 24A, 24B, and 24C are metal splices that mechanically couple the respective tensioning members to one another. However, it will be understood that other fastening hardware or coupling methods can be employed to couple the respective first and section fence sections 10,12.

Figure 2:
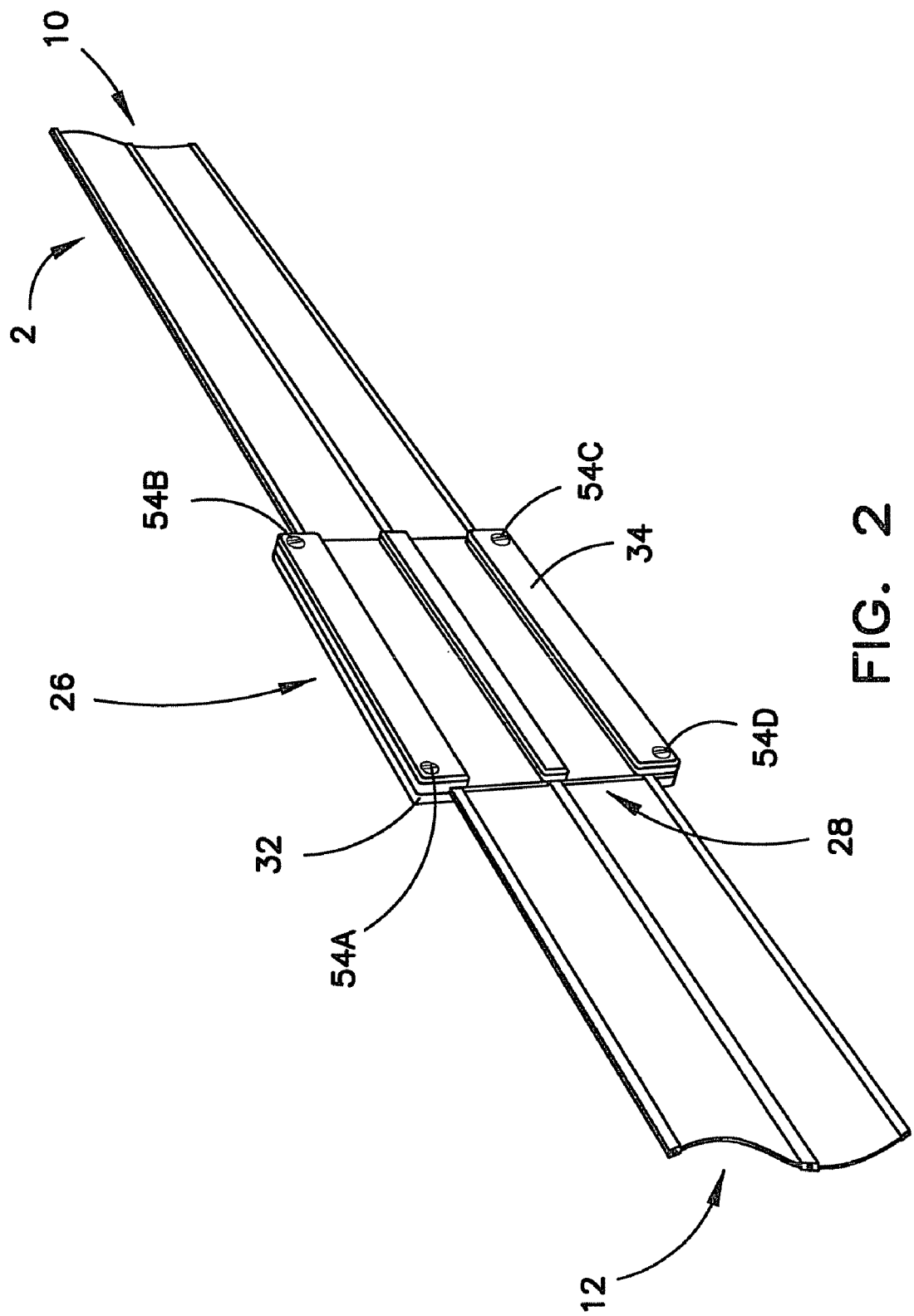
FIG. 2 is a perspective view of an improved spliced cover assembly attached and installed over two sections of polymer coated fencing that are spliced together.

As shown in FIG. 2, with continuing reference to FIG. 1, to provide added protection to the connection 14 and prevent potential injury to animals that brush against connection 14, it is desirable to provide a splice cover assembly 26 to prevent animals from coming in contact with the respective coupling mechanism 24A, 24B, and 24C. In addition, the splice cover assembly 26 has the added benefit of minimizing exposure of the tensioning members and coupling mechanisms to weather. Splice cover assemble 26 includes a first housing portion 32 and second housing portion 34 that, when joined, form a splice receiving channel 28. Splice receiving channel 28 receives first fence section 10 and second fence section 12 and, as described below, accommodates the respective coupling mechanisms 24A, 24B, and 24C (not shown). Dimensionally, splice channel 28 is sufficiently wide to accommodate the maximum thickness of the polymer sheet of the respective fence sections 10 and 12.

As further shown in FIG. 1, splice cover assembly 26 includes a first housing portion 32 and a second housing portion 34. First housing portion 32 has respective receiving channels 36A, 36B, and 36C that are each approximately parallel to one another. Second housing portion 34 has respective receiving channels 38A, 38B, and 38C (not shown) that are each approximately parallel to one another. Each respective corresponding receiving channel 34A, 34B, 34C includes splice receiving portions 40A, 40B and 40C. Similarly, receiving channels 38A, 38B, and 38C have corresponding splice receiving portions 42A, 42B and 42C (not shown).

When the respective first and second housing portion 32, 34 are assembled to form splice cover assembly 26, respective receiving channels 36A and 38A form a channel to accommodate tensioning members 20A. Splice receiving portions 40A and 42A form a pocket or cavity of sufficient size and dimension to accommodate coupling mechanism 24A. Similarly, respective channels 36B and 36C and 36C and 38C form channels to accommodate respective tensioning members 20B and 20C and coupling mechanisms 24B and 24C.

First housing portion 32 further includes four fastener receiving holes 50A, 50B, 50C and 50D to receive a suitable fastener. Second housing portion 34 further includes four corresponding fastener receiving holes 52A, 52B, 52C and 52D to receive a suitable fastener mating device. It will be understood that a fastener may be a screw, bolt, clamp, hook, rivet, snap rivet, CHRISTMAS TREE™ Clips, retention clip, STALOK™ fastener, CANOE® clips, or other securing means. Alternatively, an adhesive, epoxy, weld or other attaching technique may be used to couple first housing portion 32 and second housing portion 34 to form splice cover assembly 26. In yet another alternative, a retainer or retention mechanism can be directly molded into the respective housing portions. Illustrative, in some embodiments, the first house cover may have an engaging protrusion that engages a corresponding connecting hole located on the second house cover. In some embodiments, the engaging protrusion may further include an engagingly locking mechanism that holds the engaging protrusion in the corresponding connecting hole.

As further shown in FIG. 1, fastener receiving holes 52A, 52B, 52C and 52D receive respective screws 54A, 54B, 54C, and 54D. Corresponding fastener receiving holes 50A, 50B, 50C and 50D receive respective nuts 56A, 56B, 56C (not shown), and 56D to receive the respective screws 54A, 54B, 54C, and 54D. It will be understood that the first and second housing portions, 32, 34, may be formed to be symmetric and interchangeable. As a result, only a single type of housing portion is manufactured to go into the splice cover assembly kit. In addition, the four fastener receiving holes 50A, 50B, 50C, and 50D, as well as corresponding fastener receiving holes 52A, 52B, 52C, and 52D, may include a countersinking feature or other mechanical relief to allow a fastener to be recessed such that the fastener would not protrude substantially beyond the surface of the respective first and second housing portions 32, 34 when the slice cover assembly 26 is assembled.

As further shown in FIG. 2, the final assembly encloses connection 14 to provide a smooth exterior cover. Moreover, the respective splice receiving portions 38 A and 40A, 38B and 40B, and 38C and 40C respectively form pockets that engage the corresponding coupling mechanisms 24A, 24B and 24C to hold the splice cover assembly 26 in place with respect to first fence section 10, second fence section 12 and connection 14.

In other embodiments, the first and second housing portions may include a hinge along a non-splice receiving channel edge that couples the first and second housing portions along one edge to allow a single piece design to fold over to enclose connection 14. In still other embodiments, the splice cover assembly includes a first cover having channels for receiving the respective tensioning members, coupling mechanisms and polymer sheets, wherein the second cover is approximately flat.

In additional embodiments, the splice cover is a polymer material. In still other embodiments the splice cover is a plastic composite material. In yet other embodiments the splice cover includes an extruded vinyl portion. In yet other embodiments the splice cover is metallic.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A fence for confining livestock, the fence comprising:
   First and second parallel polymer-coated fence sections, each section including a plurality of parallel high tensile wire tensioning members extending therethrough,
   a plurality of metal splice coupling mechanisms, each mechanism coupling one of the tensioning members of the first section to one of the tensioning members of the second section such that an end of the first section is clamped to an end of the second section, the coupling mechanisms having a greater diameter than the tensioning members,
   a first cover portion having an inner surface including a plurality of parallel channels spaced from one another and extending continuously from a first end of the cover portion to a second end of the cover portion, and a plurality of cavities, each cavity coincident with one of the channels at a midpoint of the cover;
   a second cover portion having an inner surface facing the first cover inner surface, the second cover inner surface including a plurality of parallel channels spaced from one another and extending continuously from a first end of the second cover portion to a second end of the second cover portion, and a plurality of cavities, each cavity coincident with one of the second cover portion channels at a midpoint of the second cover;

a plurality of fasteners clamping the first cover to the second cover such that the ends of the first and second sections are clamped conformingly between the covers, with each tensioning member received conformingly between and within a first cover channel and second cover channel, and with each coupling mechanism received conformingly between and within a first cover cavity and second cover cavity.

\* \* \* \* \*